US012686119B2

(12) United States Patent
Wang et al.

(10) Patent No.: US 12,686,119 B2
(45) Date of Patent: Jul. 21, 2026

(54) METHOD AND SYSTEM FOR DEXTEROUS MANIPULATION BY A ROBOT

(71) Applicant: Honda Motor Co., Ltd., Tokyo (JP)

(72) Inventors: Changhao Wang, Berkeley, CA (US); Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 142 days.

(21) Appl. No.: 18/414,069

(22) Filed: Jan. 16, 2024

(65) Prior Publication Data

US 2025/0065492 A1 Feb. 27, 2025

Related U.S. Application Data

(60) Provisional application No. 63/578,052, filed on Aug. 22, 2023.

(51) Int. Cl.
*B25J 9/16* (2006.01)
*B25J 15/10* (2006.01)

(52) U.S. Cl.
CPC ............. *B25J 9/1605* (2013.01); *B25J 15/10* (2013.01)

(58) Field of Classification Search
CPC . B25J 9/1605; B25J 15/10; B25J 9/163; B25J 9/1671

See application file for complete search history.

(56) References Cited

U.S. PATENT DOCUMENTS

| | | | | |
|---|---|---|---|---|
| 9,649,764 | B1 * | 5/2017 | Sun | B25J 13/025 |
| 11,097,418 | B2 * | 8/2021 | Nagarajan | B25J 9/1612 |
| 11,314,987 | B2 * | 4/2022 | Wohlhart | B25J 9/163 |
| 12,138,805 | B2 * | 11/2024 | Sundermeyer | B25J 9/1669 |
| 12,164,299 | B2 | 12/2024 | Passot et al. | |
| 12,172,328 | B1 * | 12/2024 | Jiang | B25J 9/1671 |
| 12,330,303 | B2 * | 6/2025 | Gordon | B25J 9/1612 |

(Continued)

FOREIGN PATENT DOCUMENTS

DE 102020127508 B4 9/2022

OTHER PUBLICATIONS

S. Jin, C. Wang, and M. Tomizuka. Robust deformation model approximation for robotic cable manipulation. In 2019 IEEE/RSJ International Conference on Intelligent Robots and Systems (IROS), pp. 6586-6593. IEEE, 2019.

(Continued)

*Primary Examiner* — Sihar A Karwan
(74) *Attorney, Agent, or Firm* — Rankin, Hill & Clark LLP

(57) ABSTRACT

A system for dexterous robot manipulation includes a first robot configured to perform real simulations. The system also includes at least one computer configured to perform a set of virtual simulations including a robot model, develop a first policy for robot maneuvering based on the set of virtual simulations, and record a trajectory of the robot model during the set of virtual simulations. The at least one computer is also configured to perform a set of real simulations including the first robot, where the first robot mimics the recorded trajectory of the robot model, and develop a second policy for robot maneuvering based on the set of real simulations. The at least once computer is also configured to deploy the second policy to at least one of the first robot and a second robot to perform dexterous manipulation.

15 Claims, 10 Drawing Sheets

(56) References Cited

U.S. PATENT DOCUMENTS

| | | | | |
|---|---|---|---|---|
| 2013/0116828 A1* | 5/2013 | Krause | | B25J 9/1605 700/264 |
| 2015/0239121 A1* | 8/2015 | Takeda | | G06N 7/00 700/250 |
| 2016/0059412 A1* | 3/2016 | Oleynik | | G05B 19/42 700/250 |
| 2016/0199981 A1* | 7/2016 | Atohira | | B25J 9/1605 700/250 |
| 2019/0221037 A1* | 7/2019 | Sugaya | | B25J 9/163 |
| 2020/0101599 A1* | 4/2020 | Yoshida | | B25J 9/1697 |
| 2020/0189102 A1* | 6/2020 | Sasajima | | B25J 9/1641 |
| 2020/0306974 A1* | 10/2020 | Fattey | | B25J 9/161 |
| 2021/0086364 A1* | 3/2021 | Handa | | B25J 9/1628 |
| 2021/0125052 A1* | 4/2021 | Tremblay | | G06N 3/08 |
| 2022/0009091 A1* | 1/2022 | Moreno Noguer | .... | B25J 9/1653 |
| 2022/0032454 A1* | 2/2022 | Yang | | B25J 9/1612 |
| 2022/0126447 A1* | 4/2022 | Fu | | A63F 13/525 |
| 2022/0134537 A1* | 5/2022 | Chadalavada Vijay Kumar | | B25J 9/163 700/250 |
| 2022/0404835 A1* | 12/2022 | Gildert | | G05D 1/0038 |
| 2022/0410395 A1* | 12/2022 | Sugaya | | B25J 9/1605 |
| 2023/0321822 A1* | 10/2023 | Narang | | B25J 9/163 700/253 |
| 2024/0013542 A1* | 1/2024 | Satoh | | G06N 3/006 |
| 2024/0017426 A1* | 1/2024 | Sun | | B25J 9/1664 |
| 2024/0109188 A1* | 4/2024 | Imamura | | B25J 13/06 |
| 2024/0416510 A1* | 12/2024 | Aguirre | | B25J 9/1671 |
| 2025/0100141 A1* | 3/2025 | Jain | | B25J 9/1697 |

OTHER PUBLICATIONS

L. Ljung. System identification. Springer, 1998.
18414069_Claims_2024-01-16.pdf (claims of copending application 18414069) (Year: 2025).
C. Pepper, S. Balakirsky, and C. Scrapper. 2007. Robot simulation physics validation. In Proceedings of the 2007 Workshop on Perfomance Metrics for Intelligent Systems (PerMIS '07). Association for Computing Machinery, New York, NY, USA, 97-104. https://doi.org/10.1145/1660877.1660890.
Talon Tracked Military Robot—Army Technology.pdf (Talon Tracked Military Robot—Army Technology, 2020, https://www.army-technology.com/projects/talon-tracked-military-robot, pp. 1-7) (Year: 2020).
Office Action of U.S. Appl. No. 18/414,047 dated Aug. 19, 2025, 27 pages.
Office Action of U.S. Appl. No. 18/414,084 dated Jul. 22, 2025, 24 pages.
Y. Bai and C. K. Liu. Dexterous manipulation using both palm and fingers. In 2014 IEEE International Conference on Robotics and Automation (ICRA), pp. 1560-1565. IEEE, 2014.
C. C. Beltran-Hernandez, D. Petit, I. G. Ramirez-Alpizar, and K. Harada. Variable compliance control for robotic peg-in-hole assembly: A deep-reinforcement-learning approach. Applied Sciences, 10(19):6923, 2020.
C. C. Beltran-Hernandez, D. Petit, I. G. Ramirez-Alpizar, and K. Harada. Variable compliance control for robotic peg-in-hole assembly: A deep-reinforcement-learning approach. Applied Sciences, 10(19):6923, 2020. Y. Chebotar, A. Handa, V. Makoviychuk, M. Macklin, J. Issac, N. Ratliff, and D. Fox. Closing the sim-to-real loop: Adapting simulation randomization with real world experience. In 2019 International Conference on Robotics and Automation (ICRA), pp. 8973-8979. IEEE, 2019.
T. Chen, J. Xu, and P. Agrawal. A system for general in-hand object re-orientation. In Conference on Robot Learning, pp. 297-307. PMLR, 2022.
C. Chi, B. Burchfiel, E. Cousineau, S. Feng, and S. Song. Iterative residual policy: for goal-conditioned dynamic manipulation of deformable objects. arXiv preprint arXiv:2203.00663, 2022.

R. Chitnis, S. Tulsiani, S. Gupta, and A. Gupta. Efficient bimanual manipulation using learned task schemas. In 2020 IEEE International Conference on Robotics and Automation (ICRA), pp. 1149-1155. IEEE, 2020.
E. Coumans and Y. Bai. Pybullet, a python module for physics simulation for games, robotics and machine learning. http://pybullet.org, 2016-2019.
A. Gupta, C. Eppner, S. Levine, and P. Abbeel. Learning dexterous manipulation for a soft robotic hand from human demonstrations. In 2016 IEEE/RSJ International Conference on Intelligent Robots and Systems (IROS), pp. 3786-3793. IEEE, 2016.
L. Han and J. C. Trinkle. Dextrous manipulation by rolling and finger gaiting. In Proceedings. 1998 IEEE International Conference on Robotics and Automation (Cat. No. 98CH36146), vol. 1, pp. 730-735. IEEE, 1998.
V. Kumar, E. Todorov, and S. Levine. Optimal control with learned local models: Application to dexterous manipulation. In 2016 IEEE International Conference on Robotics and Automation (ICRA), pp. 378-383. IEEE, 2016.
A. Kumar, Z. Fu, D. Pathak, and J. Malik. Rma: Rapid motor adaptation for legged robots. arXiv preprint arXiv:2107.04034, 2021.
J. Li, X. Liu, B. Zhu, J. Jiao, M. Tomizuka, C. Tang, and W. Zhan. Guided online distillation: Promoting safe reinforcement learning by offline demonstration. arXiv preprint arXiv:2309.09408, 2023.
V. Lim, H. Huang, L. Y. Chen, J. Wang, J. Ichnowski, D. Seita, M. Laskey, and K. Goldberg. Real2sim2real: Self-supervised learning of physical single-step dynamic actions for planar robot casting. In 2022 International Conference on Robotics and Automation (ICRA), pp. 8282-8289, 2022. doi:10.1109/ICRA46639.2022.9811651.
Y. Narang, K. Storey, I. Akinola, M. Macklin, P. Reist, L. Wawrzyniak, Y. Guo, A. Mora-vanszky, G. State, M. Lu, et al. Factory: Fast contact for robotic assembly. arXiv preprint arXiv:2205.03532, 2022.
H. Qi, A. Kumar, R. Calandra, Y. Ma, and J. Malik. In-hand object rotation via rapid motor adaptation. In Conference on Robot Learning, pp. 1722-1732. PMLR, 2023.
H. Qi, B. Yi, S. Suresh, M. Lambeta, Y. Ma, R. Calandra, and J. Malik. General in-hand object rotation with vision and touch. arXiv preprint arXiv:2309.09979, 2023.
D. Rus. In-hand dexterous manipulation of piecewise-smooth 3-d objects. The International Journal of Robotics Research, 18(4):355-381, 1999.
J.-P. Saut, A. Sahbani, S. El-Khoury, and V. Perdereau. Dexterous manipulation planning using probabilistic roadmaps in continuous grasp subspaces. In 2007 IEEE/RSJ International Conference on Intelligent Robots and Systems, pp. 2907-2912. IEEE, 2007.
Y. Sun, W. L. Ubellacker, W.-L. Ma, X. Zhang, C. Wang, N. V. Csomay-Shanklin, M. Tomizuka, K. Sreenath, and A. D. Ames. Online learning of unknown dynamics for model-based controllers in legged locomotion. IEEE Robotics and Automation Letters, 6(4):8442-8449, 2021.
E. Todorov, T. Erez, and Y. Tassa. Mujoco: A physics engine for model-based control. In 2012 IEEE/RSJ Int. Conf. on Intelligent Robots and Syst., pp. 5026-5033. IEEE, 2012.
H. Van Hoof, T. Hermans, G. Neumann, and J. Peters. Learning robot in-hand manipulation with tactile features. in 2015 IEEE-ras 15th international conference on humanoid robots (humanoids). IEEE, 34:121-127, 2015.
C. Wang, Y. Zhang, X. Zhang, Z. Wu, X. Zhu, S. Jin, T. Tang, and M. Tomizuka. Offline-online learning of deformation model for cable manipulation with graph neural networks. IEEE Robotics and Automation Letters, 7(2):5544-5551, 2022.
M. Yu, K. Lv, C. Wang, M. Tomizuka, and X. Li. A coarse-to-fine framework for dual-arm manipulation of deformable linear objects with whole-body obstacle avoidance. In 2023 IEEE International Conference on Robotics and Automation (ICRA), pp. 10153-10159. IEEE, 2023.
X. Zhang, S. Jain, B. Huang, M. Tomizuka, and D. Romeres. Learning generalizable pivoting skills. arXiv preprint arXiv:2305.02554, 2023.

(56) References Cited

OTHER PUBLICATIONS

X. Zhang, C. Wang, L. Sun, Z. Wu, X. Zhu, and M. Tomizuka. Efficient sim-to-real transfer of contact-rich manipulation skills with online admittance residual learning. arXiv preprint arXiv:2310. 10509, 2023.
W. Zhou and D. Held. Learning to grasp the ungraspable with emergent extrinsic dexterity. In ICRA 2022 Workshop: Reinforcement Learning for Contact-Rich Manipulation, 2022. URL https:// openreview.net/forum?id=Zrp4wpa9lqh.

* cited by examiner

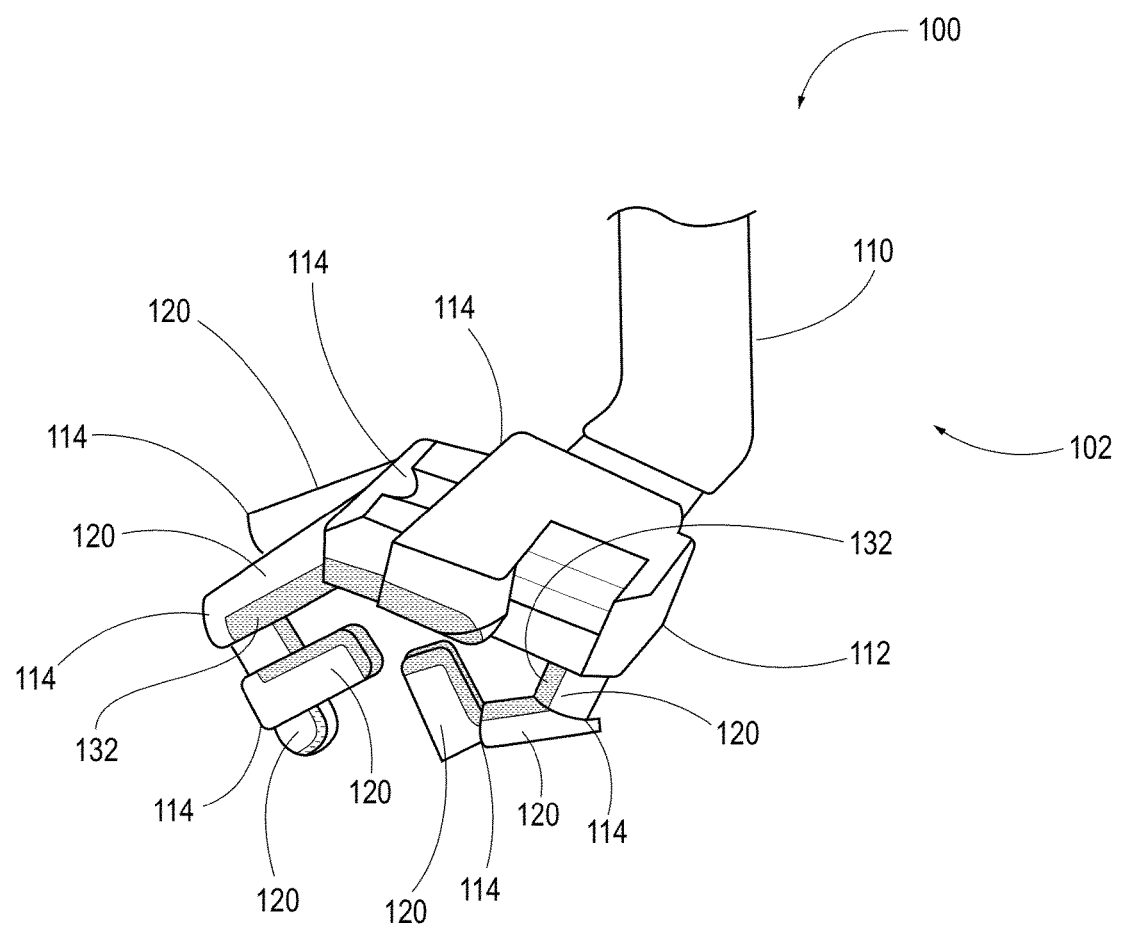
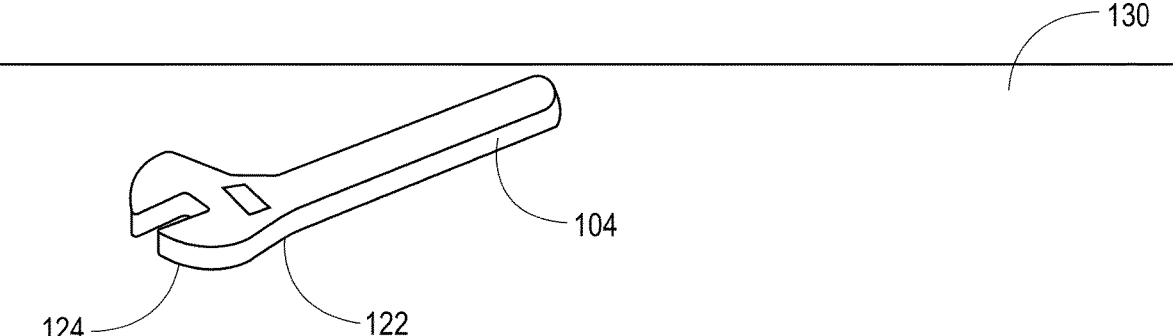
FIG. 1

500

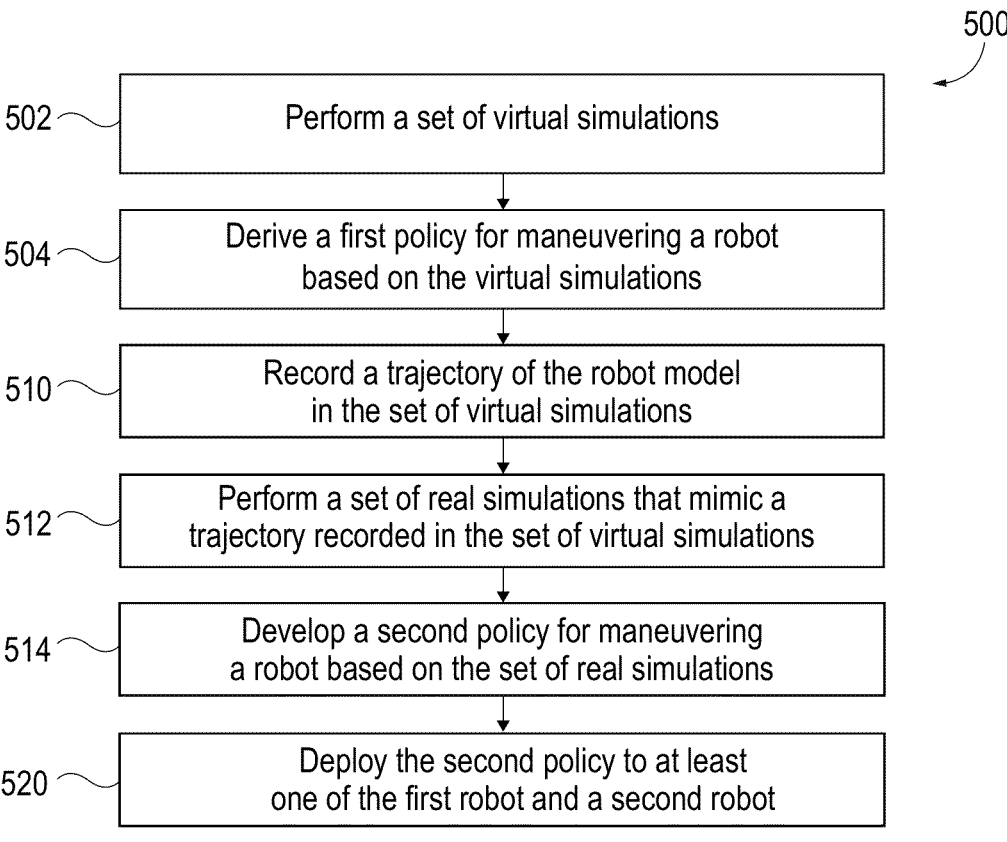

502 — Perform a set of virtual simulations

504 — Derive a first policy for maneuvering a robot
based on the virtual simulations 510 — Record a trajectory of the robot model
in the set of virtual simulations 512 — Perform a set of real simulations that mimic a
trajectory recorded in the set of virtual simulations 514 — Develop a second policy for maneuvering
a robot based on the set of real simulations 520 — Deploy the second policy to at least
one of the first robot and a second robot

610  COMPUTER
INSTRUCTIONS 604  01011010001010
10101011010101
101101011100...

602  COMPUTER READABLE
MEDIUM

METHOD AND SYSTEM FOR DEXTEROUS MANIPULATION BY A ROBOT

BACKGROUND

Dexterous manipulation is a routine part of operating handheld tools and other objects. In this regard, many handheld tools and objects may be held and operated with a grasp that is different from a grasp used for picking the tool up. Further, other types of handheld tools and objects are otherwise configured for being gripped in a variety of ways to perform work.

To turn a nut using a wrench, for example, a robotic end effector may first pick up the wrench using fingertips and then pull the wrench closer to the palm while transitioning to a power grasp so that a larger force may be applied. As such, it is often useful to change the grasp along with an object pose relative to an end effector between picking up and using the tool (e.g., in-hand manipulation).

Dexterous manipulation skills are often important, for example, in household and factory scenarios, where varieties of tasks call for a variety of handheld tools to perform work. However, there are existing challenges to obtaining robust dexterous manipulation skills in a robotic system.

For example, methods which squarely employ virtual models to learn dexterous manipulation skills are inefficient for real-time computation, often use inaccurate models for emulating real tasks, and are not robust with respect to sensor noise. Furthermore, reinforcement learning methods which squarely employ real simulations are too time consuming to train and have a large sim-to-real gap. Challenges to deploying learned dexterous manipulation skills on the real robot further arise from the sim-to-real gap, imperfect controllers, and noisy sensor measurements.

Consequently, there is demand for robotic systems with improved dexterous manipulation skills. Limitations and disadvantages of conventional and traditional approaches will become apparent to one of skill in the art, through comparison of described systems with some aspects of the present disclosure, as set forth in the remainder of the present application and with reference to the drawings.

BRIEF DESCRIPTION

According to one aspect, a system for dexterous robot manipulation includes a first robot configured to perform real simulations. The system also includes at least one computer configured to perform a set of virtual simulations including a robot model, develop a first policy for robot maneuvering based on the set of virtual simulations, and record a trajectory of the robot model during the set of virtual simulations. The at least one computer is also configured to perform a set of real simulations including the first robot, where the first robot mimics the recorded trajectory of the robot model, and develop a second policy for robot maneuvering based on the set of real simulations. The at least once computer is also configured to deploy the second policy to at least one of the first robot and a second robot to perform dexterous manipulation.

According to another aspect, a method for dexterous robot manipulation includes performing a set of virtual simulations including a robot model, developing a first policy for robot maneuvering based on the set of virtual simulations, and recording a trajectory of the robot model in the set of virtual simulations. The method also includes performing a set of real simulations including a first robot, wherein the first robot mimics the recorded trajectory of the robot model, developing a second policy for robot maneuvering based on the set of real simulations, and deploying the second policy to at least one of the first robot and a second robot to perform dexterous manipulation.

According to another aspect, a non-transitory computer readable storage medium storing instructions that, when executed by a computer having a processor, causes the processor to perform a method including performing a set of virtual simulations including a robot model, developing a first policy for robot maneuvering based on the set of virtual simulations, and recording a trajectory of the robot model in the set of virtual simulations. The method also includes performing a set of real simulations including a first robot, where the first robot mimics the recorded trajectory of the robot model. The method also includes developing a second policy for robot maneuvering based on the set of real simulations, and deploying the second policy to at least one of the first robot and a second robot to perform dexterous manipulation.

BRIEF DESCRIPTION OF THE DRAWINGS

FIG. 1 is a perspective view of a virtual simulation including a robot model and a virtual object in a virtual initial position.

FIG. 9 is an exemplary process flow for dexterous manipulation by a robot.

DETAILED DESCRIPTION

Figure 2:
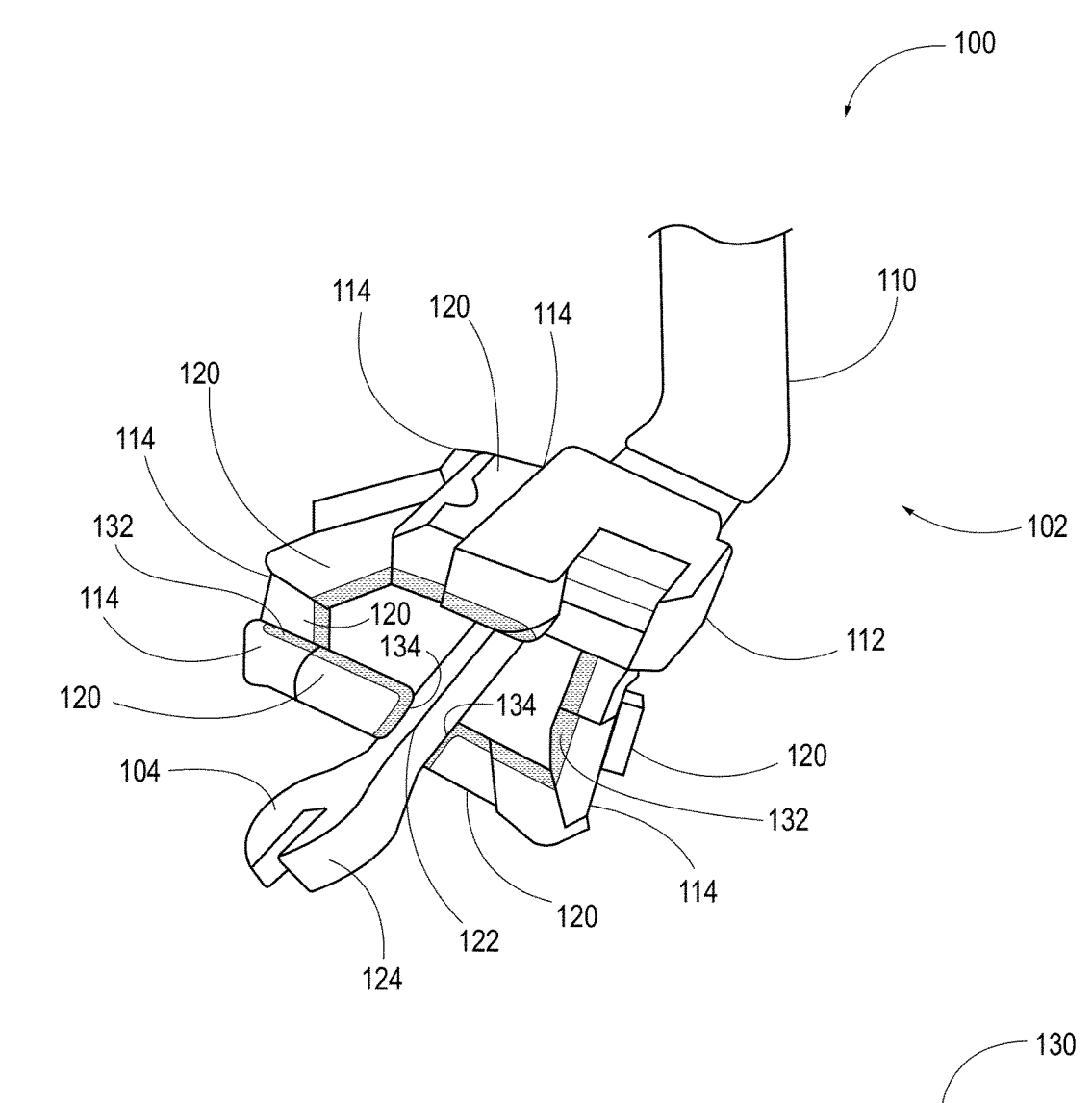
FIG. 2 is a perspective view of the virtual simulation including the robot model and the virtual object in a virtual intermediate position.

The systems and method/s disclosed herein are configured to obtain dexterous manipulation skills for a robotic system. A set of virtual simulations is performed using a robot model to generate a first policy for maneuvering a robot, and a set of real simulations is performed using a first robot configured to mimic a trajectory of the robot model and derive a second policy for maneuvering a robot. The second policy may be deployed to at least one of the first robot and a second robot to perform work in a real world application. In an embodiment, the set of virtual simulations generate tactile data that is binarized for developing the first policy, and the set of real simulations generate binary tactile data for developing the second policy.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Exemplary wearable computing devices can include, but are not limited to, watches, glasses, clothing, gloves, hats, shirts, jewelry, rings, earrings necklaces, armbands, leashes, collars, shoes, earbuds, headphones and personal wellness devices.

System Overview

Referring now to the drawings, wherein the drawings are for purposes of illustrating one or more exemplary embodiments and not for purposes of limiting the same, an embodiment of the virtual object 104 is depicted. The virtual object 104 includes the handle 122 to be manipulated directly by the robot model 102. However, it should be appreciated that the virtual object 104 may alternatively lack a handle without departing from the scope of the present disclosure.

FIG. 1 depicts the robot model 102 in the virtual initial position, where the robot model 102 is located above the virtual object 104, and the virtual object 104 is at rest on a virtual floor 130. FIG. 2 depicts the robot model 102 in a virtual intermediate position, where the virtual robotic hand 112 is gripping the handle 122 in a first position corresponding to picking the virtual object 104 off the virtual floor 130.

Figure 3:
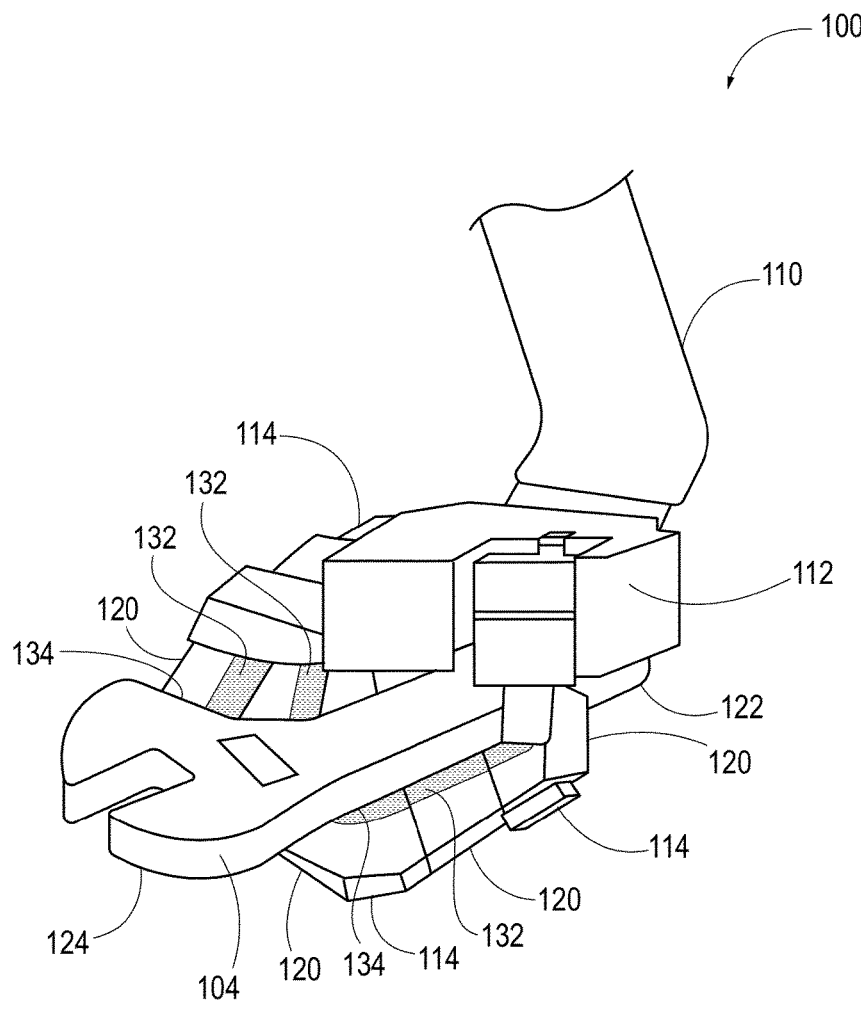
FIG. 3 is a perspective view of the virtual simulation including the robot model and the virtual object in a virtual target position.

FIG. 3 depicts the robot model 102 in the virtual target position, where the virtual robotic hand 112 is gripping the handle 122 in a second position for operating the virtual object 104. Notably, a pose and a position of the handle 122 changes relative to a pose and a position of the robot model 102 as the virtual object 104 moves from the first position toward the second position.

In an embodiment, the set of virtual simulations 100 begins with the virtual robotic hand 112 gripping the virtual object 104 in a virtual initial position as shown in FIG. 2. In such an embodiment, both the virtual initial position and the virtual target position of the robot model 102 include gripping the virtual object 104. With this construction, a policy of maneuvering a robot generated based on the virtual simulation 100 is relatively focused toward operating the virtual object 104, thereby improving an efficacy of the virtual simulation 100 and policy output therefrom without requiring additional computational resources. The set of virtual simulations 100 is performed for a plurality of iterations, where the robot model 102 adopts the virtual target position from the virtual initial position in each iteration of the set of virtual simulations 100.

With reference to FIGS. 1-3, the robot model 102 includes virtual tactile sensors 132 configured to generate tactile data during the set of virtual simulations 100. The virtual tactile sensors 132 support a plurality of taxels arranged in three-dimensional space on the virtual robotic hand 112, including on the joints 114 and connecting portions 120. The virtual tactile sensors 132 are curved to form an end effector on the virtual robotic hand 112 functional as robotic digits, joints, and fingertips for manipulating a variety of objects.

With reference to FIGS. 2 and 3, the virtual tactile sensors 132 are respectively configured to detect a force generated at a contact area 134 between the virtual tactile sensor 132 and the virtual object 104. In this regard, each taxel supported on the virtual tactile sensors 132 is configured to generate a taxel signal indicating a direction and a force generated at the taxel, in the contact area 134, when the virtual tactile sensor 132 contacts the virtual object 104.

In the depicted embodiment, each taxel supported on the virtual tactile sensors 132 is respectively configured to detect a linear force normal to an outer surface of the supporting virtual tactile sensor 132. In embodiments, each virtual tactile sensor 132 may additionally or alternatively detect up to three perpendicular linear forces including the normal linear force, and additionally or alternatively detect up to three perpendicular rotational forces. Each taxel supported on the virtual tactile sensors 132 is configured to detect an amount of a force generated at the contact area 134.

Figure 4:
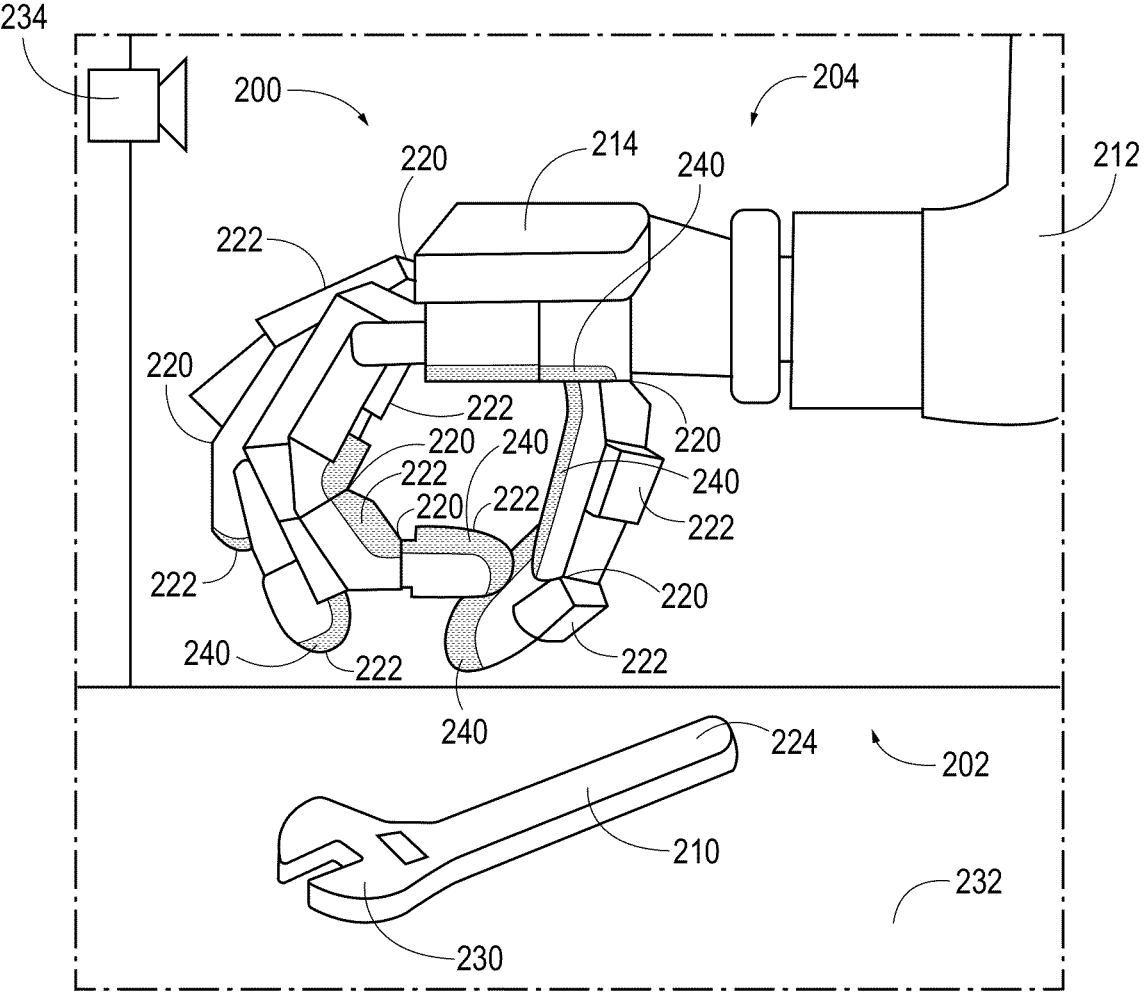
FIG. 4 is a perspective view of a test apparatus including a first robot and a real object in a real initial position.
Figure 5:
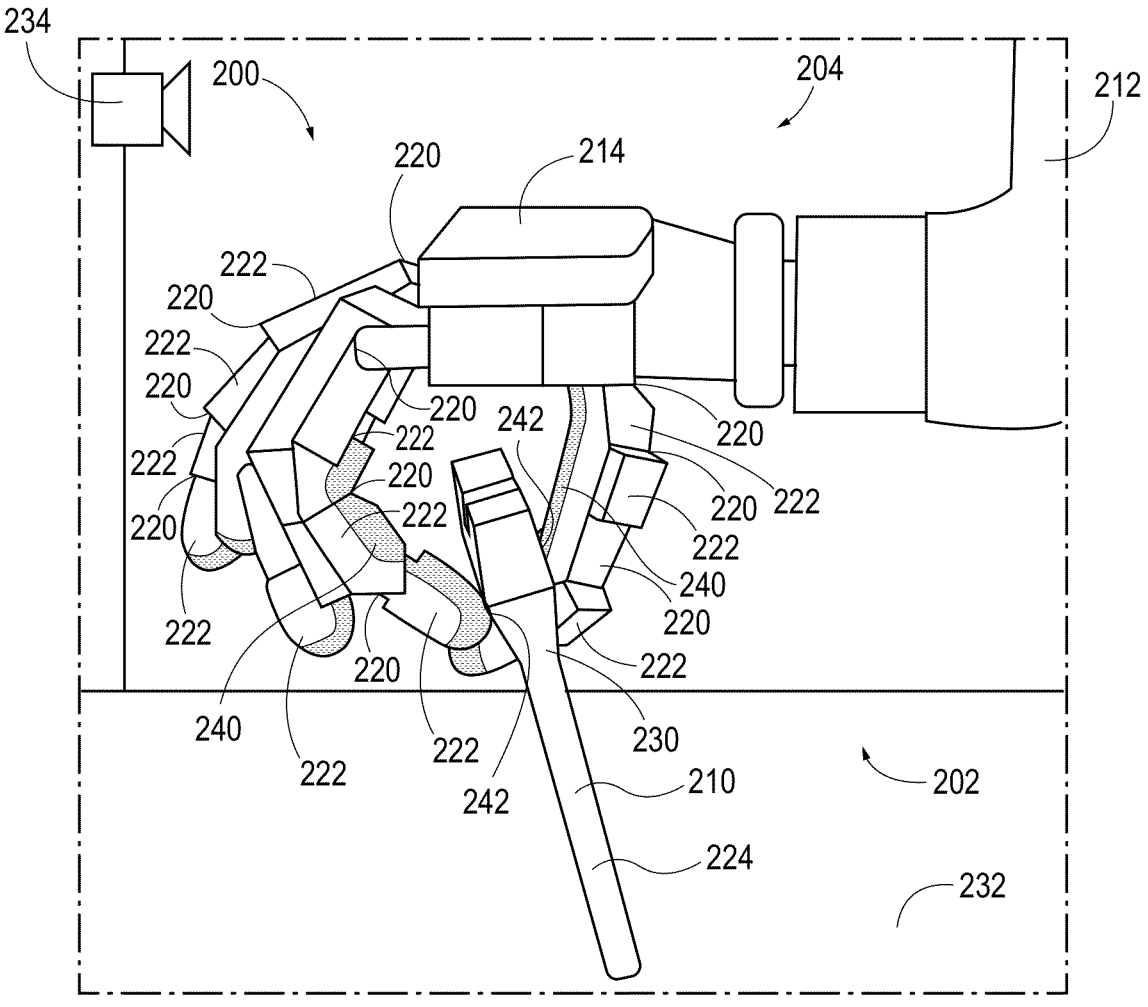
FIG. 5 is a perspective view of the test apparatus including the first robot and the real object in a real intermediate position.
Figure 6:
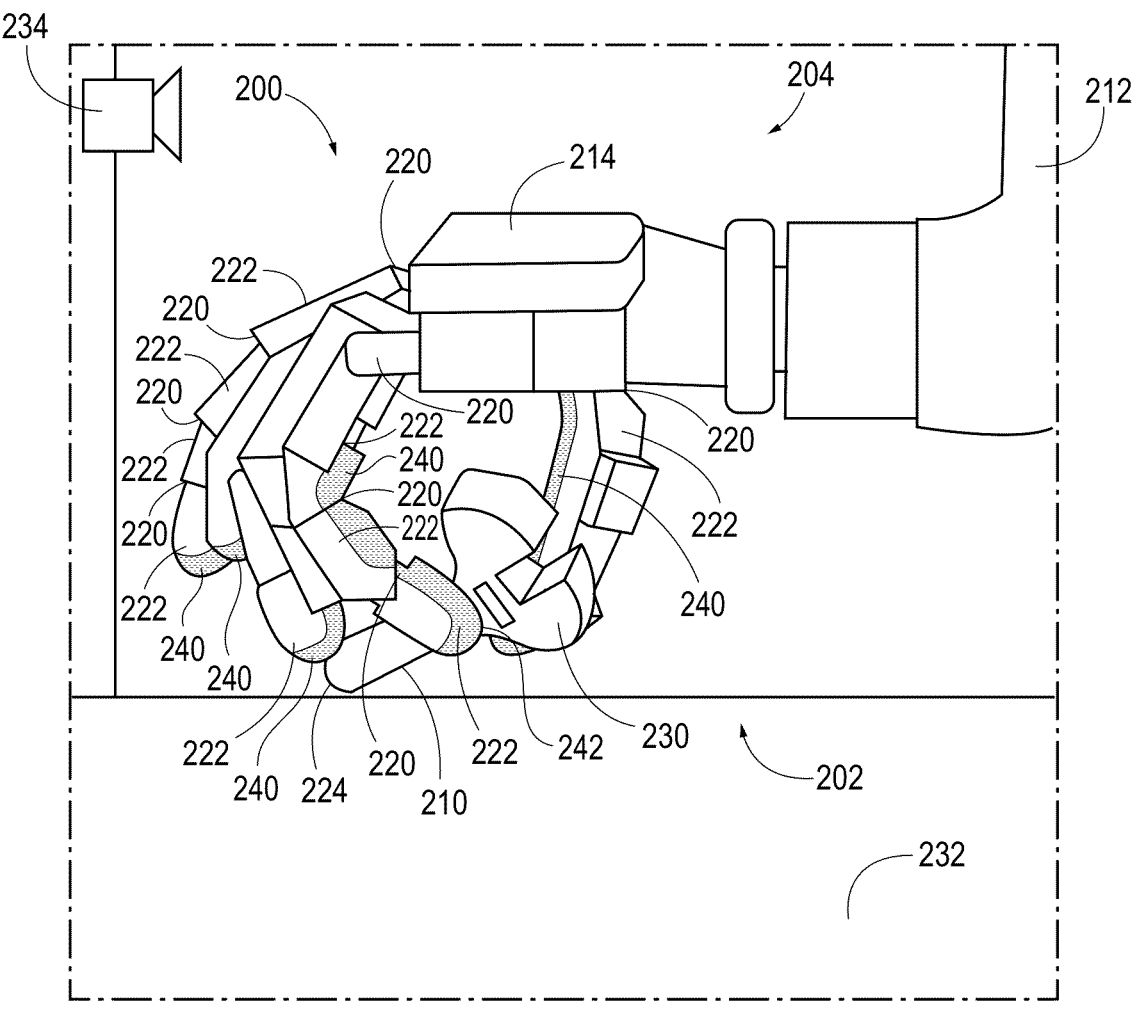
FIG. 6 is a perspective view of the test apparatus including the first robot and the real object in a real target position.

FIGS. 4-6 depict a set of real simulations 200 performed with a test apparatus 202 including a first robot 204 and a real object 210, where the first robot 204 adopts a real target position from a real initial position. The virtual simulation 100 corresponds to the set of real simulations 200, where the robot model 102 simulates the first robot 204, and the virtual object 104 simulates the real object 210.

The first robot 204 includes a robotic arm 212 connected with a real robotic hand 214 configured for gripping the real object 210. In this manner, the first robot 204 is an end effector capable of manipulating the real object 210 in the set of real simulations 200.

The robotic arm 212 and the real robotic hand 214 are each formed from rotating joints 220 and rigid connecting portions 222 having interrelated positions and orientations in a virtual space which enable maneuvering the first robot 204 for gripping and manipulating the real object 210. While, in the depicted embodiment, the first robot 204 includes the robotic arm 212 and the real robotic hand 214 as an end effector, the first robot 204 may alternatively or additionally include various types of end effectors capable of gripping and manipulating the real object 210 without departing from the scope of the present disclosure.

The real object 210 includes a handle 224 extended from a tool end portion 230. The handle 224 is elongated and configured for being gripped by the first robot 204, where the real robotic hand 214 picks up the handle 224, and repositions the handle 224 for operating the real object 210. While, in the depicted embodiment, the real object 210 is a wrench and the tool end portion 230 is a wrench head, the real object 210 may alternatively or additionally include a variety of handheld items, tools, and devices without departing from the scope of the present disclosure. In this regard, the real object 210 may be kitchen equipment such as a spatula, a spoon, and a knife, machining equipment such as a hammer, a saw, and a drill, and assembly components such as nuts, bolts, and screws. Further, while in the depicted embodiment the real object 210 includes the handle 224, the real object 210 may alternatively lack a handle, and be manipulated directly by the first robot 204 without departing from the scope of the present disclosure.

FIG. 4 depicts the first robot 204 in the real initial position, where the first robot 204 is located above the real object 210, and the real object 210 is at rest on a floor 232. FIG. 5 depicts the first robot 204 in a real intermediate position, where the real robotic hand 214 is gripping the handle 224 in a first position corresponding to picking the real object 210 off the floor 232.

FIG. 6 depicts the first robot 204 in the real target position, where the real robotic hand 214 is gripping the handle 224 in a second position for operating the real object 210. Notably, a pose and a position of the handle 224 changes relative to a pose and a position of the first robot 204 as the real object 210 moves from the first position toward the second position.

In an embodiment, the set of real simulations 200 begins with the real robotic hand 214 gripping the real object 210 in a real initial position as shown in FIG. 5. In such an embodiment, both the initial real position and the real target position of the first robot 204 include gripping the real object 210. With this construction, a policy of maneuvering a robot derived based on the set of real simulations 200 is relatively focused toward operating the real object 210, thereby improving an efficacy of the set of real simulations 200 without requiring additional computational resources. The set of real simulations 200 is performed for a plurality of iterations, where the first robot 204 adopts the virtual target position from the virtual initial position in each iteration of the set of real simulations 200.

The set of real simulations 200 includes a sensor 234 configured to generate sensor data of the first robot 204 and the real object 210. The sensor data indicates a position and a pose of the first robot 204 and the real object 210 during the set of real simulations 200.

As depicted, the sensor 234 is a camera configured to capture image data as the sensor data indicating the positions and the orientations of the joints 220, the connecting portions 222, and the real object 210 in the set of real simulations 200. While, as depicted, the sensor 234 is a camera, the sensor 234 may additionally or alternatively include a variety of sensors including potentiometers, encoders, transformers, Hall effect sensors, Eddy current sensors, piezoelectric sensors, and other sensors configured to generate data indicating the positions and orientations of the first robot 204 and the real object 210 in the set of real simulations 200 without departing from the scope of the present disclosure.

With reference to FIGS. 4-6, the first robot 204 includes real tactile sensors 240 configured to generate tactile data during the set of real simulations 200. The real tactile sensors 240 support a plurality of taxels arranged in three-dimensional space on the real robotic hand 214, including on the joints 220 and the connecting portions 222. The real tactile sensors 240 are curved to form an end effector on the real robotic hand 214 functional as robotic digits, joints, and fingertips for manipulating a variety of objects.

With reference to FIGS. 5 and 6, the real tactile sensors 240 are respectively configured to detect a force generated at a contact area 242 between the real tactile sensor 240 and the real object 210. In this regard, each taxel supported on the real tactile sensors 240 is configured to generate a taxel signal indicating a direction and a force generated at the taxel, in the contact area 242, when the real tactile sensor 240 contacts the real object 210.

In the depicted embodiment, each taxel supported on the real tactile sensors 240 is respectively configured to detect a linear force normal to an outer surface of the supporting real tactile sensor 240. In embodiments, each real tactile sensor 240 may additionally or alternatively detect up to three perpendicular linear forces including the normal linear force, and additionally or alternatively detect up to three perpendicular rotational forces.

Each taxel supported on the real tactile sensors 240 is configured to detect whether a force is generated at the contact area. In this manner, the real tactile sensors 240 are binary tactile sensors configured to generate binary tactile data during the set of real simulations 200.

Figure 7:
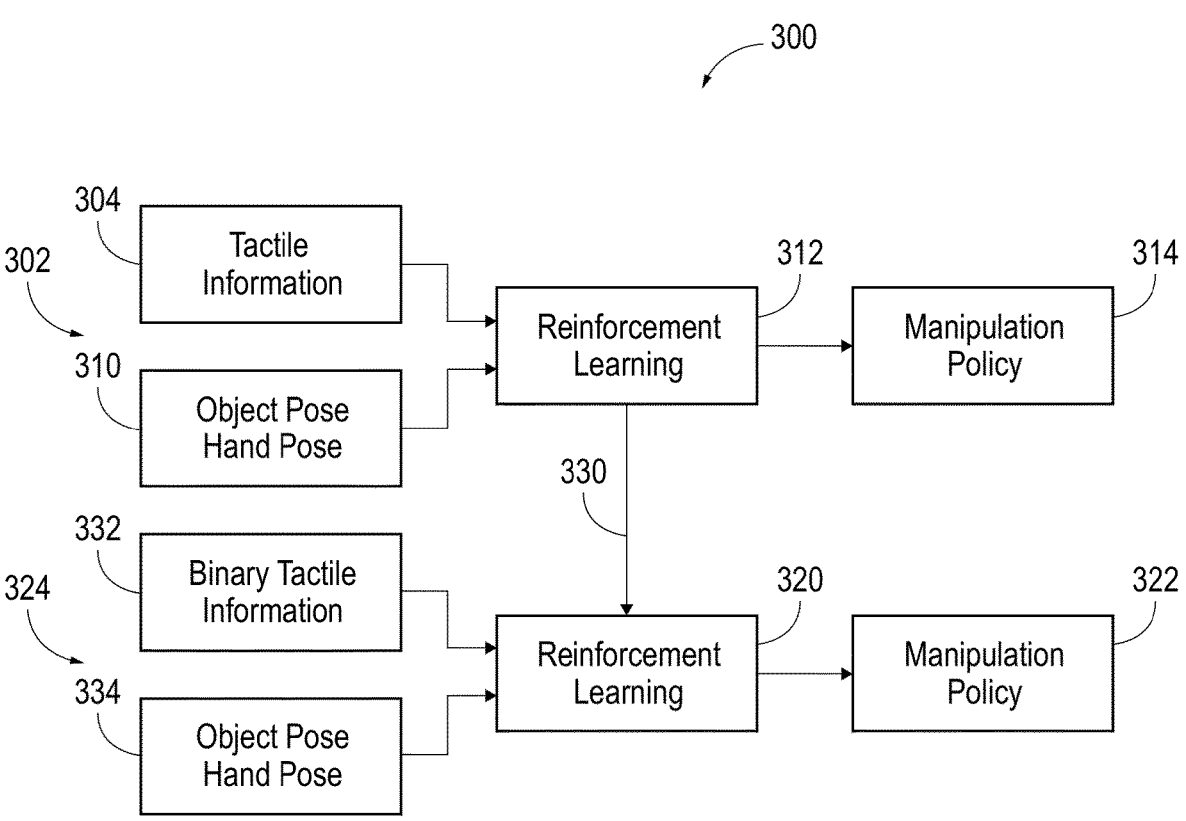
FIG. 7 is a diagram of a learning framework for dexterous manipulation by a robot.

FIG. 7 depicts a learning framework 300 for dexterous manipulation by a robot. The learning framework 300 performs the set of virtual simulations 100 and the set of real simulations 200 to derive a policy for maneuvering a robot.

As shown in FIG. 7, the set of virtual simulations 100 generates virtual simulation information 302 including virtual tactile data 304 that indicates tactile data from the virtual tactile sensors 132. The virtual simulation information 302 also includes virtual simulation data 310 recorded directly from the set of virtual simulations 100, indicating the pose and the position of both the virtual robotic hand 112 and the virtual object 104 in the set of virtual simulations 100.

The learning framework 300 includes at least one reinforcement learning module including a first machine learning algorithm configured to receive the virtual simulation information 302 for developing policies for maneuvering a robot. In this regard, the learning framework 300 includes a first reinforcement learning module 312 configured for receiving the virtual tactile data 304 and the virtual simulation data 310 for developing a first policy 314 for maneuvering a robot.

The first reinforcement learning module 312 binarizes the tactile data from the virtual tactile sensors 132, and processes the binarized tactile data as the virtual tactile data 304 to develop the first policy 314. Notably, binarizing the tactile data from the virtual tactile sensors 132 reduces the tactile data to a binary format, similar to the binary tactile data generated by the real tactile sensors 240. In an embodiment, the tactile data from the virtual tactile sensors 132 is binarized with a nonzero threshold value, such that force values recorded below the nonzero threshold value are set to a first value, and force values recorded above the nonzero threshold value are set to a second value different from the first value.

The first machine learning algorithm is employed in the first reinforcement learning module 312 to develop the first policy 314, and incorporates a smoothness incentive that reduces an acceleration of at least one of the joints 114 and the connecting portions 120 forming the virtual robotic hand 112 in the set of virtual simulations 100. In this manner, the first machine learning algorithm is configured to produce a policy which limits acceleration of a robot and an object manipulated by the robot, thereby reducing a tendency of the robot to drop the object.

The virtual initial position of the virtual robotic hand 112 and the virtual object 104 is randomized over the set of virtual simulations 100. As such, the virtual initial position of the virtual robotic hand 112 and the virtual object 104 is inconsistent among iterations of the set of virtual simulations 100.

The first reinforcement learning module 312 is configured to develop the first policy 314 over the iterations in the set of virtual simulations 100, incorporating trajectories of the robot model 102 and the virtual object 104 from the inconsistent virtual initial positions. In this manner, the first policy 314 produced by the first machine learning algorithm is focused toward adapting the virtual target position from a random initial position, and is relatively adapted toward real-world applications of a robot as compared to a policy that requires a specific and fixed initial position.

The first reinforcement learning module 312 is configured to add noise to the virtual simulation information 302, and derive the first policy 314 based on the virtual simulation information 302 with the added noise. More specifically, the first reinforcement learning module 312 is configured to add noise to the pose and the position of the virtual robotic hand 112 and the virtual object 104 through each iteration of the set of virtual simulations 100. In this manner, the first reinforcement learning module 312 is configured to produce the first policy 314 as relatively robust with respect to overcoming real sensor noise in a real world environment, as compared to a policy that is developed without added noise.

In an embodiment, 10 degrees of noise is added to the pose and the position of the virtual robotic hand 112 and the virtual object 104 to simulate noise from the sensor data generated in the set of real simulations 200 indicating an orientation of the real object 210. Noise may additionally or alternatively be added to pose data and position data of the virtual object 104 and the robot model 102, including positions and orientations of the joints 114 and the connecting portions 120, where the machine learning algorithm derives the first policy based on the pose data and the position data of the robot model 102 with the added noise. In this manner, the first policy produced by the first machine learning algorithm is robust to sensor noise in a real world environment of a robot, such as the first robot 204 in the set of real simulations 200, as compared to a policy derived from virtual data that is consistently recorded.

The first reinforcement learning module 312 is configured to randomize the pose and the position of the virtual object 104, a contact force between the virtual object 104 and the robot model 102, a mass of the virtual object 104, a center of mass of the virtual object 104, and an amount of friction between the virtual object 104 and the robot model 102 at multiple time steps in the set of virtual simulations 100. In this manner, the first policy 314 produced by the first machine learning algorithm accounts for imperfect machines and other real-world factors, and is robust as compared to a policy derived using consistently modeled aspects of a robot manipulating an object.

With continued reference to FIG. 7, the first reinforcement learning module 312 is configured to record a trajectory of the robot model 102 during the set of virtual simulations 100. In the set of virtual simulations 100, the robot model 102 adopts the virtual target position from the virtual initial position with a trajectory determined by the first policy. Notably, as the first machine learning algorithm processes iterations of the set of virtual simulations 100, the first machine learning algorithm refines the first policy 314, and consequently refines the trajectory of the robot model 102 from the virtual initial position to the virtual target position in the set of virtual simulations 100.

The learning framework 300 includes a second reinforcement learning module 320 configured to develop a second policy 322 for maneuvering a robot based on the trajectory of the robot model 102 in the set of virtual simulations 100, and based on real simulation information 324 generated in the set of real simulations 200. In this regard, the second reinforcement learning module 320 is configured to receive a recorded trajectory from the first reinforcement learning module 312, indicated by an arrow 330. The second reinforcement learning module 320 is also configured to perform the set of real simulations 200 with the test apparatus 202, where the first robot 204 mimics the recorded trajectory of the robot model 102 from the set of virtual simulations 100.

The real simulation information 324 generated in the set of real simulations 200 includes real tactile data 332 that indicates the binary tactile data from the real tactile sensors 240. The real simulation information 324 also includes real simulation data 334 generated by the sensor 234, indicating the pose and the position of both the real robotic hand 214 and the real object 210 in the set of real simulations 200.

The second reinforcement learning module 320 is configured to develop the second policy 322 based on the real tactile data 332 and the real simulation data 334 generated in the set of real simulations 200. Notably, because the tactile data from the virtual tactile sensors 132 is binarized for developing the first policy 314, the tactile data from the virtual tactile sensors 132 is provided in a similar format as the binary tactile data from the real tactile sensors 240. With this construction, the recorded trajectory provided by the first reinforcement learning module 312 is more reproducible in the second reinforcement learning module 320 as compared to a trajectory developed using data lacking a binary format. As such, binarizing the tactile data from the virtual tactile sensors 132 facilitates closing a sim-to-real gap between the set of virtual simulations 100 and the set of real simulations 200.

The at least one machine learning algorithm includes a second machine learning algorithm different from the first machine learning algorithm, and employed in the second reinforcement learning module 320 to develop the second policy 322. The second machine learning algorithm incorporates a smoothness incentive that reduces an acceleration of at least one of the joints 220 and the connecting portions 222 forming the real robotic hand 214 in the set of real simulations 200. In this manner, the second machine learning algorithm is configured to produce a policy which limits acceleration of a robot and an object manipulated by the robot, thereby reducing a tendency of the robot to drop the object.

The real initial position of the real robotic hand 214 and the real object 210 is randomized over the set of real simulations 200. As such, the real initial position of the real robotic hand 214 and the real object 210 is inconsistent among iterations of the set of real simulations 200.

The second reinforcement learning module 320 is configured to develop the second policy 322 over the iterations in the set of real simulations 200, incorporating trajectories of the first robot 204 and the real object 210 from the inconsistent real initial positions. In this manner, the second policy 322 produced by the second machine learning algorithm is focused toward adapting the real target position from a random initial position, and is relatively adapted toward real-world applications of a robot as compared to a policy that requires a specific and fixed initial position.

The virtual target position in the set of virtual simulations 100 disposes the robot model 102 and the virtual object 104 in a same pose and a same position as the real target position of the first robot 204 and the real object 210 in the set of real simulations 200. As such, policies produced from the set of virtual simulations 100 and the set of real simulations 200 are both relatively focused toward specific actions, such as picking up and operating a hand tool, as compared to a policy developed based on moving the robot model 102 and the virtual object 104 toward a distinct or otherwise unrelated target position.

While, as described, the at least one machine learning algorithm includes the first machine learning algorithm employed in the first reinforcement learning module 312, and includes the second machine learning algorithm employed in the second reinforcement learning module 320, the at least one machine learning algorithm may additionally or alternatively include a single machine learning algorithm that is employed in both the first reinforcement learning module 312 for developing the first policy 314, and the second reinforcement learning module for developing the second policy 322.

Figure 8:
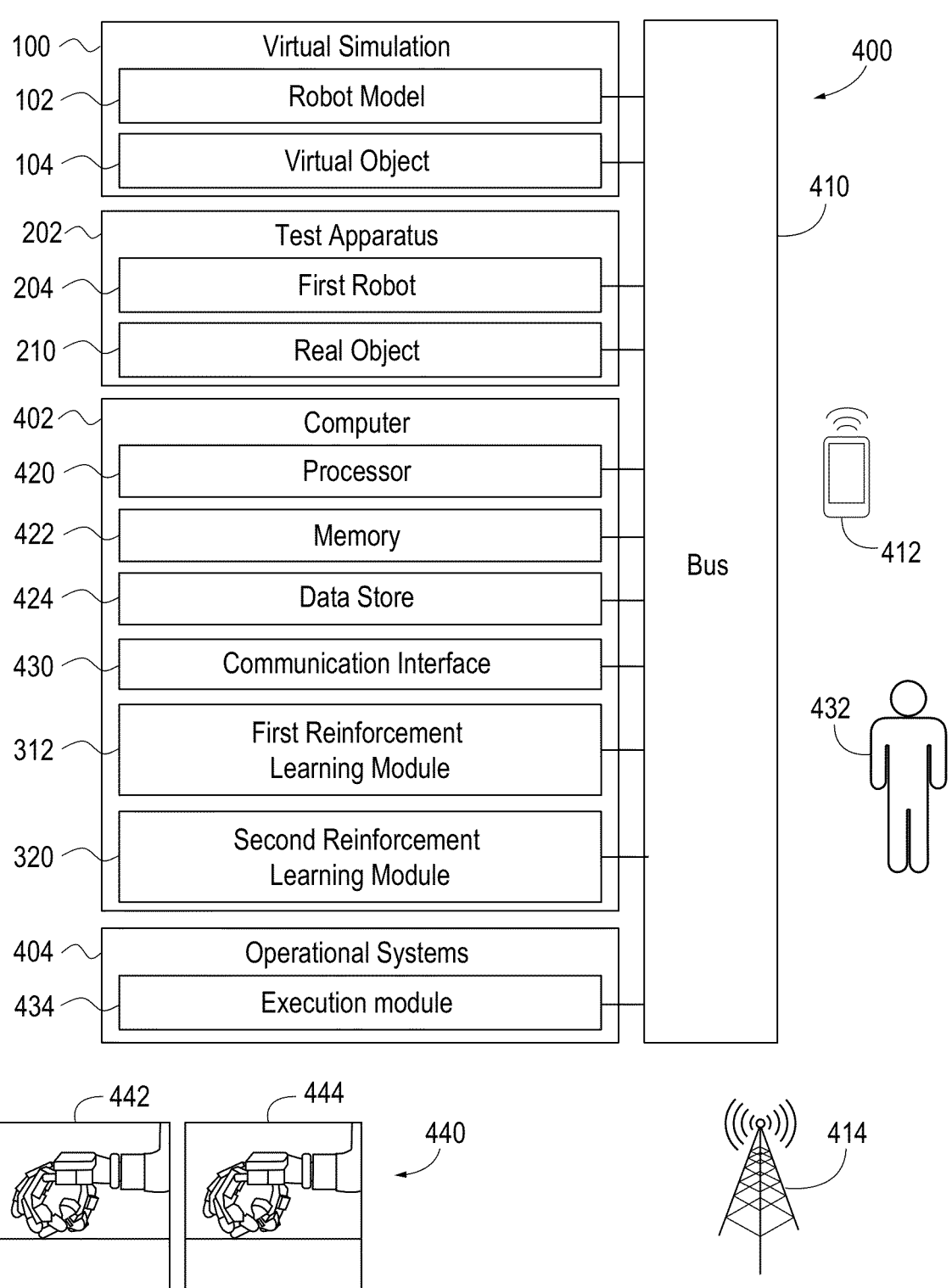
FIG. 8 is an exemplary operating environment of a system for dexterous manipulation by a robot.

FIG. 8 is an exemplary component diagram of an operating environment 400 for dexterous manipulation by a robot, according to one aspect. The operating environment 400 includes the test apparatus 202, a computer 402, and operational systems 404. The test apparatus 202, the computer 402, and the operational systems 404 may be interconnected by a bus 410. The components of the operating environment 400, as well as the components of other systems, hardware architectures, and software architectures discussed herein, may be combined, omitted, or organized into different architectures for various embodiments. The computer 402 may be implemented with a device or remotely stored.

The computer 402 may be configured to execute the virtual simulation 100, implemented as a part of the test apparatus 202, and support elements of the learning framework 300. The computer 402 may be implemented as part of a telematics unit or an electronic control unit among other potential aspects of the test apparatus 202. In other embodiments, the components and functions of the computer 402 can be implemented with other devices such as a portable device 412, database, remote server, or another device connected via a network (e.g., a network 414).

The computer 402 may be capable of providing wired or wireless computer communications utilizing various protocols to send and receive electronic signals internally to and from components of the operating environment 400. Additionally, the computer 402 may be operably connected for internal computer communication via the bus 410 (e.g., a Controller Area Network (CAN) or a Local Interconnect Network (LIN) protocol bus) to facilitate data input and output between the computer 402 and the components of the operating environment 400.

The computer 402 includes a processor 420, a memory 422, a data store 424, and a communication interface 430, which are each operably connected for computer communication via the bus 410 and/or other wired and wireless technologies. The communication interface 430 provides software and hardware to facilitate data input and output between the components of the computer 402 and other components, networks, and data sources, which will be described herein.

The computer 402 is also operably connected for computer communication (e.g., via the bus 410 and/or the communication interface 430) to one or more operational systems 404. The operational systems 404 can include, but are not limited to, any automatic or manual systems that can be used to enhance the test apparatus 202, and facilitate operation of the test apparatus 202 by a user 432. The operational systems 404 include an execution module 434. The execution module 434 monitors, analyzes, and/or operates the test apparatus 202, to some degree. For example, the execution module 434 may store, calculate, and provide information about the test apparatus 202, such as previous usage statistics, including sensor data from previous use.

The operational systems 404 also include and/or are operably connected for computer communication to the test apparatus 202. For example, one or more sensors including the sensor 234 of the test apparatus 202 may be incorporated with the execution module 434 to monitor characteristics of the test apparatus 202 such as the pose and the position of the first robot 204, the real object 210, the floor 232 and other aspects of the test apparatus 202. In another embodiment, the test apparatus 202 may communicate with one or more devices or services (e.g., a wearable computing device, non-wearable computing device, cloud service, etc.) to perform simulations including the set of real simulations 200.

The test apparatus 202, the computer 402, and/or the operational systems 404 are also operatively connected for computer communication to and via the network 414. The network 414 is, for example, a data network, the Internet, a wide area network (WAN) or a local area (LAN) network. The network 414 serves as a communication medium to various remote devices (e.g., databases, web servers, remote servers, application servers, intermediary servers, client machines, or other portable devices).

With continued reference to FIG. 8, the operating environment 400 includes a plurality of robots 440 which include similar features and function in a similar manner as the first robot 204 with respect to manipulating an object. While, as depicted, the plurality of robots 440 includes a second robot 442 and a third robot 444, the plurality of robots 440 may include more or fewer robots similar to the first robot 204 without departing from the scope of the present disclosure.

Each robot in the plurality of robots 440 is configured to receive and execute a policy derived by the computer 402 for maneuvering the robot in a real world application. In this regard, the computer 402 is configured to deploy the second policy 322 developed in the learning framework 300 to at least one robot in the plurality of robots 440 for real world applications in manipulating objects.

While, as depicted, the portable device 412 is a handheld computing device including a display with a graphic user interface for enabling the user 432 to provide instructions for directing a robot, the portable device 412 may additionally or alternatively include a wearable computing device corresponding to a robot. For example, the portable device 412 may include a data glove or a robotic glove worn by the user 432. With this construction, the data glove or the robotic glove correspond to a robotic hand configured for receiving instruction from the user 432, aided by the deployed policy.

As such, the operating environment 400 facilitates improved dexterous manipulation performance by a robot through developing and deploying a policy for maneuvering the robot that incorporates virtual data from a virtual simulation and sensor data from a real simulation. Detailed embodiments describing exemplary methods using the system and network configuration discussed above will now be discussed in detail II. Methods for Dextrous Manipulation by a Robot Referring to FIG. 9, a method 500 for dexterous manipulation by a robot will be described according to an exemplary embodiment. FIG. 9 will be described with reference to FIGS. 1-8. For simplicity, the method 500 will be described as a sequence of blocks, but the elements of the method 500 can be organized into different architectures, elements, stages, and/or processes.

At block 502, the method 500 includes performing the set of virtual simulations 100 including the robot model 102. Performing the set of virtual simulations 100 includes generating tactile data of the robot model 102.

The robot model 102 includes the virtual robotic hand 112, and performing the set of virtual simulations 100 includes generating the virtual simulation information 302, including the virtual simulation data 310 indicating at least one of the pose and the position of the virtual robotic hand 112. The virtual robotic hand 112 is formed from the joints 114 and the connecting portions 120, which are configured to grip the virtual object 104 in the set of virtual simulations 100.

The set of virtual simulations 100 includes the virtual object 104 to be manipulated by the virtual robotic hand 112. Performing the set of virtual simulations 100 includes the robot model 102 adopting the virtual target position from the virtual initial position in each iteration of the set of virtual simulations 100, where the virtual initial position of the robot model 102 is randomized over the set of virtual simulations 100.

The virtual target position and the virtual initial position both include the virtual robotic hand 112 gripping the virtual object 104, where the pose and the position of the virtual object 104 changes relative to the pose and the position of the virtual robotic hand 112 as the virtual robotic hand 112 moves from the virtual initial position toward the virtual target position.

With continued reference to FIG. 9, at block 504, the method 500 includes developing the first policy 314 for maneuvering a robot based on the set of virtual simulations 100. Developing the first policy 314 includes binarizing the tactile data of the robot model 102 generated by the virtual tactile sensors 132 in the set of virtual simulations 100, and developing the first policy 314 based on the binarized tactile data.

Developing the first policy 314 also includes employing the at least one machine learning algorithm in the first reinforcement learning module 312. In this regard, the at least one machine learning algorithm processes the virtual simulation information 302 to develop the first policy 314, and incorporates a smoothness incentive that reduces an acceleration of at least one of the joints 114 and the connecting portions 120 forming the virtual robotic hand 112 in the set of virtual simulations 100. Developing the first policy 314 also includes adding noise to the virtual simulation information 302, and developing the first policy 314 based on the virtual simulation information 302 with the added noise.

At block 510, the method 500 includes recording a trajectory of the robot model 102 in the set of virtual simulations 100. The recorded trajectory is provided from the first reinforcement learning module 312 to the second reinforcement learning module 320 for developing the second policy 322.

At block 512, the method 500 includes performing the set of real simulations 200 including the first robot 204, where the first robot 204 mimics the recorded trajectory of the robot model 102. Performing the set of real simulations 200 includes generating binary tactile data of the first robot 204, and developing the second policy 322 based on the binary tactile data.

The first robot 204 includes the real robotic hand 214, and developing the second policy 322 also includes developing the second policy 322 based on the real simulation information 324, including the real simulation data 334 indicating the pose and the position of the real robotic hand 214 in the set of real simulations 200. The real robotic hand 214 is formed from the joints 220 and the connecting portions 222 configured to grip and manipulate the real object 210 in the set of real simulations 200.

The set of real simulations 200 includes the real object 210 to be manipulated by the real robotic hand 214, and performing the set of real simulations 200 includes the real robotic hand 214 adopting the real target position from the real initial position in each iteration of the set of real simulations 200. The real target position and the real initial position both include the real robotic hand 214 gripping the real object 210, where the pose and the position of the real object 210 changes relative to the pose and the position of the real robotic hand 214 as the real robotic hand 214 moves from the real initial position toward the real target position.

At block 514, the method 500 includes developing the second policy 322 for maneuvering a robot based on the set of real simulations 200. Developing the second policy 322 includes developing the second policy 322 based on the binary tactile data of the first robot 204.

Developing the second policy 322 includes employing the at least one machine learning algorithm in the second reinforcement learning module 320. The at least one machine learning algorithm incorporates a smoothness incentive that reduces an acceleration of the joints 220 and the connecting portions 222 forming the real robotic hand 214 in the set of real simulations 200.

At block 520, the method 500 includes deploying the second policy 322 to at least one of the first robot 204 and the second robot 442 to perform dexterous manipulation. In an embodiment, the method 500 includes deploying the second policy 322 to the portable device 412 for operation by the user 432.

Figure 10:
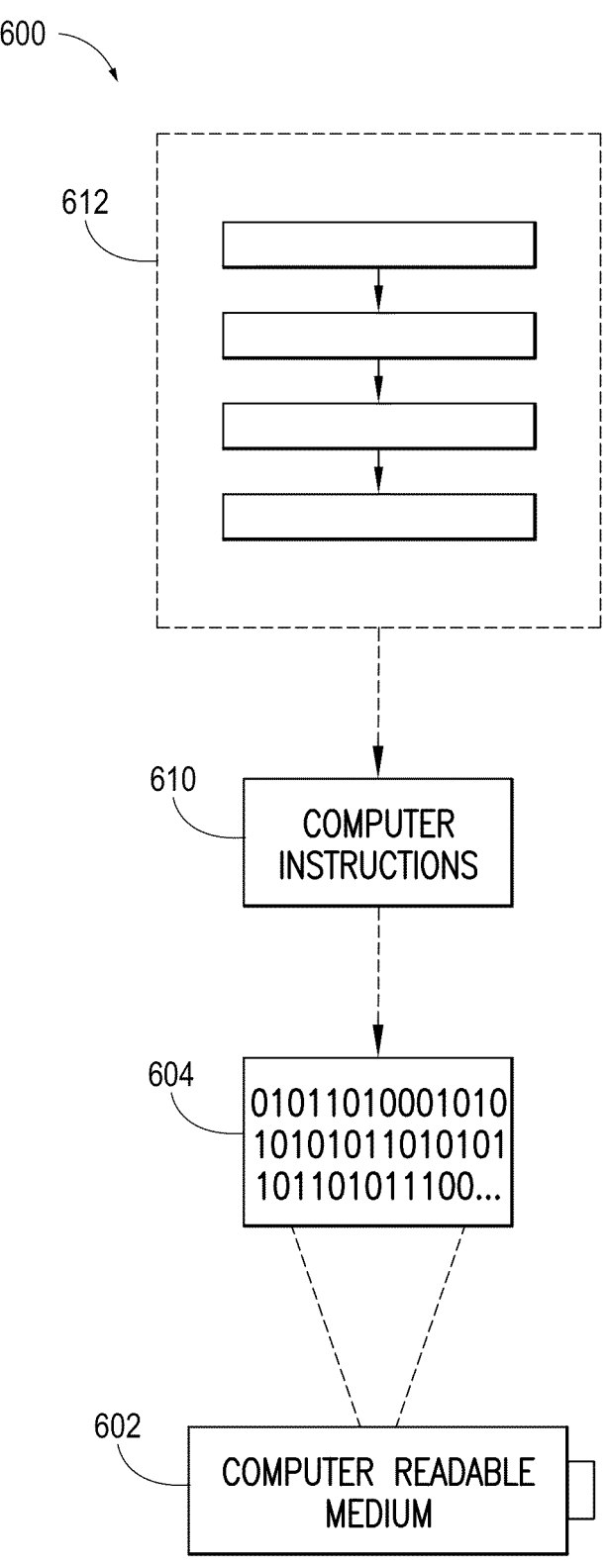
FIG. 10 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 10, where an implementation 600 includes a computer-readable medium 602, such as a CD-R, DVD-R, flash drive, a platter of a hard disk drive, etc., on which is encoded computer-readable data 604. This encoded computer-readable data 604, such as binary data including a plurality of zero's and one's as shown in 604, in turn includes a set of processor-executable computer instructions 610 configured to operate according to one or more of the principles set forth herein. In this implementation 600, the processor-executable computer instructions 610 may be configured to perform a method 612, such as the method 500 of FIG. 9. In another aspect, the processor-executable computer instructions 610 may be configured to implement a system, such as the operating environment 400 of FIG. 8. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that varieties of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for dexterous robot manipulation, the system comprising:

a first robot configured to perform real simulations;

at least one computer configured to:

perform a set of virtual simulations including a virtual robot model, develop a first policy for robot maneuvering based on the set of virtual simulations, and record a trajectory of the robot model during the set of virtual simulations;

perform a set of real simulations including the first robot, wherein the first robot mimics the recorded trajectory of the robot model, and develop a second policy for robot maneuvering based on the set of real simulations; and deploy the second policy to at least one of the first robot and a second robot to perform dexterous manipulation, wherein the robot model includes a virtual robotic hand, and the at least one computer is configured to develop the first policy based on virtual simulation information indicating at least one of a pose and a position of the virtual robotic hand in the set of virtual simulations, wherein the virtual robotic hand of the robot model includes a virtual tactile sensor configured to generate tactile simulation data during the set of virtual simulations, wherein the at least one computer is configured to binarize the tactile simulation data, and to develop the first policy based on the binarized tactile simulation data, wherein the first robot includes a real tactile sensor configured to generate binary tactile real data during the set of real simulations, and the at least one computer is configured to develop the second policy based on the binary tactile real data.

2. The system of claim 1, wherein the at least one computer is configured to add noise to the virtual simulation information, and derive the first policy based on the virtual simulation information with the added noise.

3. The system of claim 1, wherein the set of virtual simulations includes a virtual object to be manipulated by the robot model, and the at least one computer is configured to develop the first policy based on virtual sensor information indicating at least one of a pose and a position of the virtual object in the set of virtual simulations.

4. The system of claim 1, wherein the first robot includes a real robotic hand, and the at least one computer is configured to develop the second policy based on real simulation information indicating at least one of a pose and a position of the real robotic hand in the set of real simulations.

5. The system of claim 1, wherein the set of real simulation includes a real object to be manipulated by the first robot, and the at least one computer is configured to develop the second policy based on real simulation information indicating at least one of a pose and a position of the real object in the set of real simulations.

6. The system of claim 1, wherein the robot model includes the virtual robotic hand formed from joints and connecting portions configured to grip a virtual object in the set of virtual simulations, the first robot includes a real robotic hand formed from joints and connecting portions configured to grip and manipulate a real object in the set of real simulations, the at least one computer is configured to employ at least one machine learning algorithm in developing the first policy, wherein the at least one machine learning algorithm incorporates a smoothness incentive that reduces an acceleration of at least one of a joint and a connecting portion forming the virtual robotic hand in the set of virtual simulations, and the at least one computer is configured to employ the at least one machine learning algorithm in developing the second policy, wherein the at least one machine learning algorithm incorporates a smoothness incentive that reduces an acceleration of at least one of a joint and a connecting portion forming the real robotic hand in the set of real simulations.

7. The system of claim 1, wherein the robot model adopts a virtual target position from a virtual initial position in each iteration of the set of virtual simulations, and the first robot adopts a real target position from a real initial position in each iteration of the set of real simulations.

8. The system of claim 7, wherein the set of virtual simulations includes a virtual object, the robot model includes the virtual robotic hand, and at least one of the virtual target position and the virtual initial position include the virtual robotic hand gripping the virtual object, and the set of real simulations includes a real object, the first robot includes a real robotic hand, and at least one of the real target position and the real initial position include the real robotic hand gripping the real object.

9. The system of claim 8, wherein the virtual target position and the virtual initial position both include the virtual robotic hand gripping the virtual object, wherein at least one of a pose and a position of the virtual object changes relative to a pose and a position of the virtual robotic hand as the virtual robotic hand moves from the virtual initial position toward the virtual target position, and the real target position and the real initial position both include the real robotic hand gripping the real object, wherein at least one of a pose and a position of the real object changes relative to a pose and a position of the real robotic hand as the real robotic hand moves from the real initial position toward the real target position.

10. The system of claim 7, wherein the virtual initial position is randomized over the set of virtual simulations, and the real initial position is randomized over the set of real simulations.

11. A method for dexterous robot manipulation, the method comprising:

performing a set of virtual simulations including a virtual robot model;

developing a first policy for robot maneuvering based on the set of virtual simulations;

recording a trajectory of the robot model in the set of virtual simulations;

performing a set of real simulations including a first robot, wherein the first robot mimics the recorded trajectory of the robot model;

developing a second policy for robot maneuvering based on the set of real simulations; and deploying the second policy to at least one of the first robot and a second robot to perform dexterous manipulation, wherein the robot model includes a virtual robotic hand, and the method includes developing the first policy based on virtual simulation information indicating at least one of a pose and a position of the virtual robotic hand in the set of virtual simulations, wherein performing the set of virtual simulations includes generating tactile simulation data of the robot model, developing the first policy includes binarizing the tactile simulation data generated in the set of virtual simulations, and developing the first policy based on the binarized tactile simulation data of the robot model, performing the set of real simulations includes generating binary tactile real data of the first robot, developing the second policy includes developing the second policy based on the binary tactile real data of the first robot.

12. The method of claim 11, wherein the robot model includes the virtual robotic hand, performing the set of virtual simulations includes generating virtual simulation information indicating at least one of a pose and a position of the virtual robotic hand, developing the first policy includes adding noise to the virtual simulation information, and developing the first policy based on the virtual simulation information with the added noise, the first robot includes a real robotic hand, and developing the second policy includes developing the second policy based on real simulation information indicating at least one of a pose and a position of the real robotic hand in the set of real simulations.

13. The method of claim 12, wherein the robot model includes the virtual robotic hand formed from joints and connecting portions configured to grip a virtual object in the set of virtual simulations, the first robot includes a real robotic hand formed from joints and connecting portions configured to grip and manipulate a real object in the set of real simulations, developing the first policy includes employing at least one machine learning algorithm, wherein the at least one machine learning algorithm incorporates a smoothness incentive that reduces an acceleration of at least one of a joint and a connecting portion forming the virtual robotic hand in the set of virtual simulations, and developing the second policy includes employing the at least one machine learning algorithm, wherein the at least one machine learning algorithm incorporates a smoothness incentive that reduces an acceleration of at least one of a joint and a connecting portion forming the real robotic hand in the set of real simulations.

14. The method of claim 12, wherein the set of virtual simulations includes a virtual object to be manipulated by the virtual robotic hand, performing the set of virtual simulations includes the robot model adopting a virtual target position from a virtual initial position in each iteration of the set of virtual simulations, wherein the virtual initial position of the robot model is randomized over the set of virtual simulations, the virtual target position and the virtual initial position both include the virtual robotic hand gripping the virtual object, wherein at least one of a pose and a position of the virtual object changes relative to the pose and the position of the virtual robotic hand as the virtual robotic hand moves from the virtual initial position toward the virtual target position, the set of real simulations includes a real object to be manipulated by the real robotic hand, performing the set of real simulations includes the real robotic hand adopting a real target position from a real initial position in each iteration of the set of real simulations, wherein the real initial position of the robot model is randomized over the set of real simulations, the real target position and the real initial position both include the real robotic hand gripping the real object, wherein at least one of a pose and a position of the real object changes relative to the pose and the position of the real robotic hand as the real robotic hand moves from the real initial position toward the real target position, the virtual target position disposes the robot model in a same pose as the real target position of the first robot, and at least one of the pose of the virtual object, a contact force between the virtual object and the robot model, a mass of the virtual object, a center of mass of the virtual object, and an amount of friction between the virtual object and the robot model is randomized at multiple time steps in the set of virtual simulations.

15. A non-transitory computer readable storage medium storing instructions that, when executed by a computer having a processor, causes the processor to perform a method, the method comprising:

performing a set of virtual simulations including a virtual robot model;

developing a first policy for robot maneuvering based on the set of virtual simulations;

recording a trajectory of the robot model in the set of virtual simulations;

performing a set of real simulations including a first robot, wherein the first robot mimics the recorded trajectory of the robot model;

developing a second policy for robot maneuvering based on the set of real simulations; and deploying the second policy to at least one of the first robot and a second robot to perform dexterous manipulation, wherein the robot model includes a virtual robotic hand, and the method includes developing the first policy based on virtual simulation information indicating at least one of a pose and a position of the virtual robotic hand in the set of virtual simulations, wherein performing the set of virtual simulations includes generating tactile simulation data of the robot model, developing the first policy includes binarizing the tactile simulation data generated in the set of virtual simulations, and developing the first policy based on the binarized tactile simulation data of the robot model, performing the set of real simulations includes generating binary tactile real data of the first robot, developing the second policy includes developing the second policy based on the binary tactile real data of the first robot.

\* \* \* \* \*